US012792675B2

(12) United States Patent
Nallamothu

(10) Patent No.: US 12,792,675 B2
(45) Date of Patent: Nov. 10, 2026

(54) TECHNOLOGIES FOR PRIVACY SEARCH AND REMEDIATION

(71) Applicant: PRIVACY CHECK, INC., Detroit, MI (US)

(72) Inventor: Karthik Nallamothu, Singapore (SG)

(73) Assignee: Privacy Check, Inc., Detroit, MI (US)

( * ) Notice: Subject to any disclaimer, the term of this patent is extended or adjusted under 35 U.S.C. 154(b) by 0 days.

(21) Appl. No.: 19/111,812

(22) PCT Filed: Sep. 30, 2022

(86) PCT No.: PCT/US2022/077358
§ 371 (c)(1),
(2) Date: Mar. 14, 2025

(87) PCT Pub. No.: WO2024/072457
PCT Pub. Date: Apr. 4, 2024

(65) Prior Publication Data

US 2025/0390538 A1 Dec. 25, 2025

(51) Int. Cl.
*G06F 16/951* (2019.01)
*G06F 21/62* (2013.01)

(52) U.S. Cl.
CPC ........ *G06F 16/951* (2019.01); *G06F 21/6254* (2013.01)

(58) Field of Classification Search
CPC .. G06F 16/951; G06F 16/953; G06F 16/9532; G06F 16/9538; G06F 21/6254; G06F 2221/2143; G06Q 30/0615; G06N 3/0464; G06N 3/04; G06N 3/08; G06N 3/0895; G06N 3/09; G06N 3/091;
(Continued)

(56) References Cited

U.S. PATENT DOCUMENTS

2012/0136985 A1 5/2012 Popescu et al.
2014/0007247 A1 1/2014 Carter et al.
(Continued)

FOREIGN PATENT DOCUMENTS

WO WO-2021081464 A1 * 4/2021 ............... G06N 3/09

OTHER PUBLICATIONS

PCT Search Report and Written Opinion prepared for PCT Application No. PCT/US2022/077358, mained Dec. 19, 2022.

*Primary Examiner* — Michael Pham
(74) *Attorney, Agent, or Firm* — Barnes & Thornburg LLP

(57) ABSTRACT

Technologies for privacy search and remediation include a privacy server that receives seed data for a privacy search. The seed data is general data relevant to an individual. The privacy server searches multiple internet sites based on the seed data to identify privacy relevant search results, extracts privacy relevant entities from the privacy relevant search results, and refines the privacy relevant entities to generate an individual privacy profile. Refining the privacy relevant entities may include disambiguating the entities by analyzing the entities with multimodal, trained artificial intelligence models and removing irrelevant entities from the profile. To remediate a privacy relevant search result, the privacy server may identify an internet source associated with the privacy relevant search result, select a predefined microbot based on the internet source, and execute a remediation operation defined by the microbot. Other embodiments are described and claimed.

17 Claims, 6 Drawing Sheets

(58) Field of Classification Search
CPC ........ G06N 3/092; G06N 3/094; G06N 3/096; G06N 3/098; G06N 3/0985
USPC .......................................................... 707/706
See application file for complete search history.

(56) References Cited

U.S. PATENT DOCUMENTS

| | | | | |
|---|---|---|---|---|
| 2016/0012561 | A1 | 1/2016 | Lappenbusch et al. | |
| 2017/0161520 | A1 | 6/2017 | Lockhart et al. | |
| 2017/0206431 | A1 | 7/2017 | Sun et al. | |
| 2019/0034708 | A1 | 1/2019 | Yoo et al. | |
| 2021/0042408 | A1* | 2/2021 | Van Dyke | G06F 21/552 |
| 2022/0171873 | A1* | 6/2022 | Lundbæk | G06N 3/082 |
| 2023/0214521 | A1* | 7/2023 | Amico | G06Q 50/40 726/1 |

* cited by examiner

TECHNOLOGIES FOR PRIVACY SEARCH AND REMEDIATION

CROSS-REFERENCE TO RELATED APPLICATIONS

This application claims priority to and is a U.S. national stage entry under 35 U.S.C. § 371(b) of PCT International Application No. PCT/US2022/077358, filed Sep. 30, 2022, the entire disclosure of which is hereby expressly incorporated herein by reference.

BACKGROUND

Personally identifying information (PII) and other privacy-relevant data related to an individual may be widely available across the public web. Certain instances of privacy-relevant data may be created or controlled by the individual, but numerous other instances may be created by third parties (for example, by social media users, data broker websites, or other third parties). Additionally, certain privacy relevant data may be hidden or obscured in deep layer websites. Having such privacy-relevant data publically available may put an individual at risk of identity theft, fraud, or other harm. However, due to the vast scale of the public web, locating privacy-relevant data related to a particular individual on the public web using typical web search tools is not feasible. Additionally, removing privacy-relevant data from the public web is typically a manual process that is often difficult or impossible.

SUMMARY

According to one aspect of the disclosure, a computing device for privacy management includes a user interface manager, a privacy search engine, a privacy extraction engine, and a multimodal privacy analysis engine. The user interface manager is to receive seed data for a privacy search. The seed data comprises general data relevant to an individual, wherein the general data comprises a name, a company, a city of residence, or an email address. The privacy search engine is to search a plurality of internet sites based on the seed data to identify a plurality of privacy relevant search results. Each privacy relevant search result is associated with an internet source and an internet resource. The privacy extraction engine is to extract a plurality of privacy relevant entities from the plurality of privacy relevant search results. Each entity of the privacy relevant entities comprises a multimodal asset. The a multimodal privacy analysis engine is to refine the plurality of privacy relevant entities to generate an individual privacy profile. The individual privacy profile identifies privacy relevant entities and associated privacy relevant search results, and wherein the individual privacy profile is associated with the individual. The user interface manager is further to present the individual privacy profile to a user.

In an embodiment, to search the plurality of internet sites comprises to rank the plurality of privacy relevant search results according to privacy relevance. In an embodiment, to extract the plurality of privacy relevant entities comprises to detect personally identifiable information from the plurality of privacy relevant search results.

In an embodiment, to extract the plurality of privacy relevant entities comprises to perform object detection for privacy sensitive content from the plurality of privacy relevant search results. In an embodiment, to perform object detection comprises to classify objects with a fast region-based convolutional neural network (Fast R-CNN) algorithm. In an embodiment, to perform object detection comprises to detect a high-value asset in a privacy relevant search result; detect luxury travel in a privacy relevant search result; detect drug or alcohol content in a privacy relevant search result; or detect sex or nudity content in a privacy relevant search result.

In an embodiment, to extract the plurality of privacy relevant entities comprises to detect a home address in an image or video of a privacy relevant search result. In an embodiment, to extract the plurality of privacy relevant entities comprises to extract a child's name or age in a privacy relevant search result. In an embodiment, to extract the plurality of privacy relevant entities comprises to identify a social media account associated with the individual in a privacy relevant search result. In an embodiment, to extract the plurality of privacy relevant entities comprises to identify a controversial conversation in a privacy relevant search result. In an embodiment, to extract the plurality of privacy relevant entities comprises to identify a current vacation post or a not home post in a privacy relevant search result. In an embodiment, to extract the plurality of privacy relevant entities comprises to extract a banking challenge question or a banking challenge answer in a privacy relevant search result.

In an embodiment, to extract the plurality of privacy relevant entities comprises to perform hybrid pixel-level deepfake analysis to identify falsified content. In an embodiment, to perform the hybrid pixel-level deepfake analysis comprises to classify an image or video of the privacy relevant search results with a deep recursive neural network trained at pixel level to generate a first deepfake classification; classify the image or video of the privacy relevant search results with a neural perceptron trained at a level higher than pixel level to generate a second deepfake classification; determine whether the first deepfake classification and the second deepfake classification commonly classify part or all of the image or video as a deepfake; and tag the image or video as a possible deepfake in response to a determination that the first deepfake classification and the second deepfake classification commonly classify part or all of the image or video as a deepfake.

In an embodiment, to refine the plurality of privacy relevant entities to generate the individual privacy profile comprises to analyze the plurality of privacy relevant entities with a plurality of trained artificial intelligence models, wherein the plurality of privacy relevant entities comprise a plurality of entity modalities; and remove an irrelevant entity from the plurality of privacy relevant entities in response to analysis of the plurality of privacy relevant entities. In an embodiment, to refine the plurality of privacy relevant entities to generate the individual privacy profile comprises to disambiguate the plurality of privacy relevant entities.

In an embodiment, the computing device further comprises a privacy remediation engine to identify the internet source associated with a privacy relevant search result of the plurality of privacy relevant search results in response to presentation of the individual privacy profile to the user; select a microbot from a plurality of predefined microbots based on the internet source; and execute a remediation operation defined by the microbot. In an embodiment, to execute the remediation operation comprises to send a request for removal based on a predetermined template of the microbot. In an embodiment, to execute the remediation operation comprises to provide information to the internet source based on a predetermined information definition of the microbot. In an embodiment, to execute the remediation operation further comprises to receive the information from a user. In an embodiment, to receive the information from the user comprises to receive an authorization from the user. In an embodiment, to execute the remediation operation comprises to process a response received from the internet source based on a predetermined processing definition of the microbot. In an embodiment, to execute the remediation operation comprises to execute predetermined interaction logic of the microbot.

In an embodiment, to execute the remediation operation comprises to process a response received from the internet source with a trained model of the microbot. In an embodiment, to execute the remediation operation comprises to generate a request for removal with a trained model of the microbot and send the request for removal.

According to another aspect, a method for privacy management comprises receiving, by a computing device, seed data for a privacy search, the seed data comprising general data relevant to an individual, wherein the general data comprises a name, a company, a city of residence, or an email address; searching, by the computing device, a plurality of internet sites based on the seed data to identify a plurality of privacy relevant search results, wherein each privacy relevant search result is associated with an internet source and an internet resource; extracting, by the computing device, a plurality of privacy relevant entities from the plurality of privacy relevant search results, wherein each entity of the privacy relevant entities comprises a multimodal asset; refining, by the computing device, the plurality of privacy relevant entities to generate an individual privacy profile, wherein the individual privacy profile identifies privacy relevant entities and associated privacy relevant search results, and wherein the individual privacy profile is associated with the individual; and presenting, by the computing device, the individual privacy profile to a user.

In an embodiment, searching the plurality of internet sites comprises ranking the plurality of privacy relevant search results according to privacy relevance. In an embodiment, extracting the plurality of privacy relevant entities comprises detecting personally identifiable information from the plurality of privacy relevant search results.

In an embodiment, extracting the plurality of privacy relevant entities comprises performing object detection for privacy sensitive content from the plurality of privacy relevant search results. In an embodiment, performing object detection comprises classifying objects with a fast region-based convolutional neural network (Fast R-CNN) algorithm. In an embodiment, performing object detection comprises detecting a high-value asset in a privacy relevant search result; detecting luxury travel in a privacy relevant search result; detecting drug or alcohol content in a privacy relevant search result; or detecting sex or nudity content in a privacy relevant search result.

In an embodiment, extracting the plurality of privacy relevant entities comprises detecting a home address in an image or video of a privacy relevant search result. In an embodiment, extracting the plurality of privacy relevant entities comprises extracting a child's name or age in a privacy relevant search result. In an embodiment, extracting the plurality of privacy relevant entities comprises identifying a social media account associated with the individual in a privacy relevant search result. In an embodiment, extracting the plurality of privacy relevant entities comprises identifying a controversial conversation in a privacy relevant search result. In an embodiment, extracting the plurality of privacy relevant entities comprises identifying a current vacation post or a not home post in a privacy relevant search result. In an embodiment, extracting the plurality of privacy relevant entities comprises extracting a banking challenge question or a banking challenge answer in a privacy relevant search result.

In an embodiment, extracting the plurality of privacy relevant entities comprises performing hybrid pixel-level deepfake analysis to identify falsified content. In an embodiment, performing the hybrid pixel-level deepfake analysis comprises classifying an image or video of a privacy relevant search results with a deep recursive neural network trained at pixel level to generate a first deepfake classification; classifying the image or video of the privacy relevant search results with neural perceptron trained at a level higher than pixel level to generate a second deepfake classification; determining whether the first deepfake classification and the second deepfake classification commonly classify part or all of the image or video as a deepfake; and tagging the image or video as a possible deepfake in response to determining that the first deepfake classification and the second deepfake classification commonly classify part or all of the image or video as a deepfake.

In an embodiment, refining the plurality of privacy relevant entities to generate the individual privacy profile comprises analyzing the plurality of privacy relevant entities with a plurality of trained artificial intelligence models, wherein the plurality of privacy relevant entities comprise a plurality of entity modalities; and removing an irrelevant entity from the plurality of privacy relevant entities in response to analyzing the plurality of privacy relevant entities. In an embodiment, refining the plurality of privacy relevant entities to generate the individual privacy profile comprises disambiguating the plurality of privacy relevant entities.

In an embodiment, the method further comprises identifying, by the computing device, the internet source associated with a privacy relevant search result of the plurality of privacy relevant search results in response to presenting the individual privacy profile to the user; selecting, by the computing device, a microbot from a plurality of predefined microbots based on the internet source; and executing, by the computing device, a remediation operation defined by the microbot. In an embodiment, executing the remediation operation comprises sending a request for removal based on a predetermined template of the microbot. In an embodiment, executing the remediation operation comprises providing information to the internet source based on a predetermined information definition of the microbot. In an embodiment, executing the remediation operation further comprises receiving the information from a user. In an embodiment, receiving the information from the user comprises receiving an authorization from the user. In an embodiment, executing the remediation operation comprises processing a response received from the internet source based on a predetermined processing definition of the microbot. In an embodiment, executing the remediation operation comprises executing predetermined interaction logic of the microbot.

In an embodiment, executing the remediation operation comprises processing a response received from the internet source with a trained model of the microbot. In an embodiment, executing the remediation operation comprises (i) generating a request for removal with a trained model of the microbot and (ii) sending the request for removal.

BRIEF DESCRIPTION OF THE DRAWINGS

The detailed description particularly refers to the accompanying figures in which.

DETAILED DESCRIPTION

Figure 1:
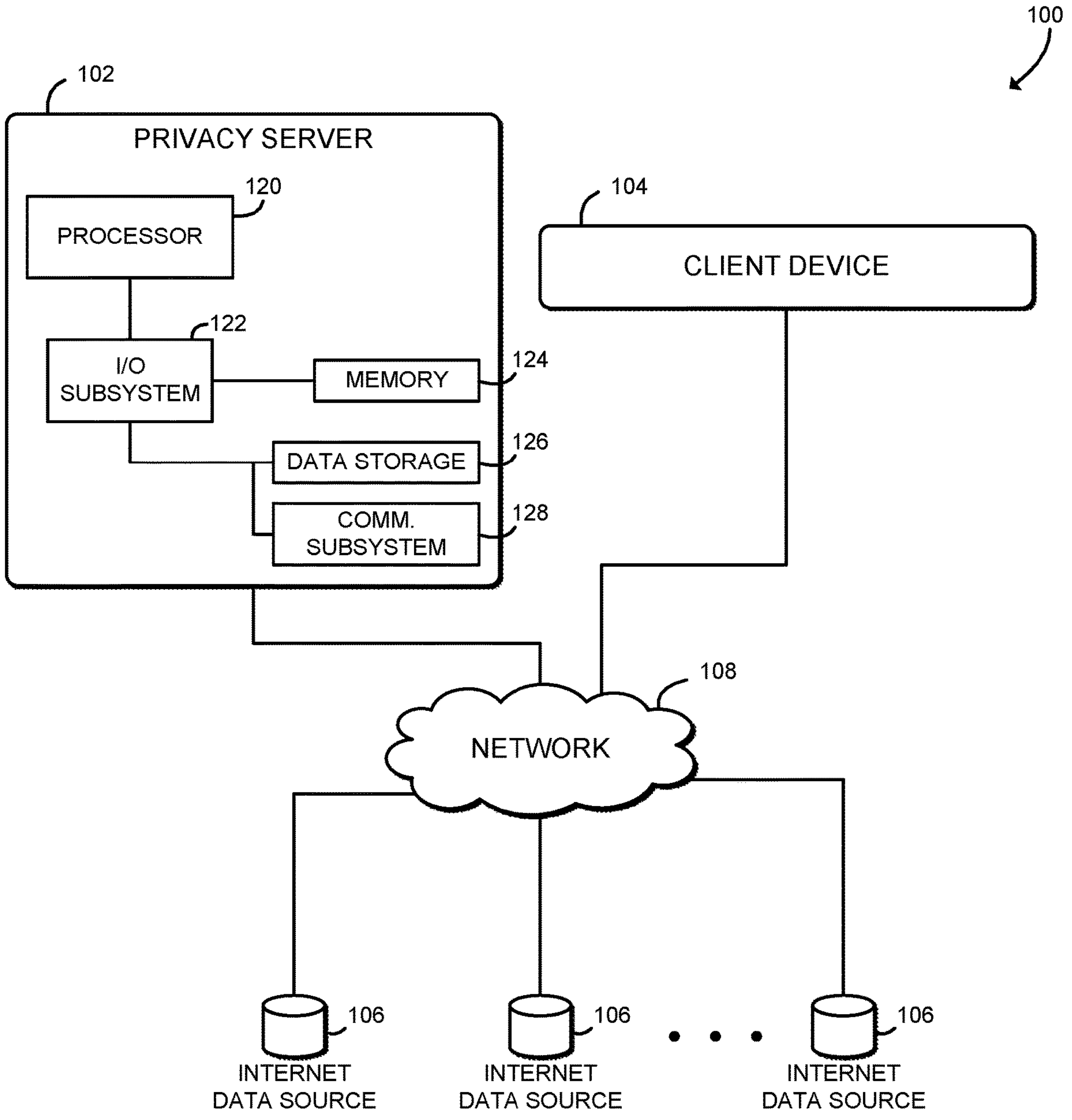
FIG. 1 is a simplified block diagram of at least one embodiment of a system for privacy search and remediation.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); or (A, B, and C). Similarly, items listed in the form of "at least one of A, B, or C" can mean (A); (B); (C): (A and B); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Referring now to FIG. 1, an illustrative system 100 includes a privacy server 102 that may be in communication with one or more client devices 104 and multiple internet data sources 106 over a network 108. In use, as described further below, the client device 104 provides seed data regarding an individual to the privacy server 102. The privacy server 102 performs a privacy search for privacy relevant data across the internet data sources 106, extracts privacy relevant entities from the search results, and refines a profile of privacy relevant entities related to the individual. The privacy server 102 may perform automated remediation in order to remove privacy relevant entities or other information from the associated internet data sources 106. Thus, the system 100 allows an individual to automatically or semi-automatically identify and/or remediate privacy relevant data that may be scattered across the public web, including deep layer websites, data brokers, and other difficult to manage websites. Accordingly, the system 100 allows the individual to identify, remediate, and otherwise manage privacy relevant data across a much larger range of potential data sources than was previously feasible. Further, by refining the profile relevant to the individual, the system 100 may reduce false positives and otherwise improve efficiency of the privacy search and remediation.

The privacy server 102 may be embodied as any type of device capable of performing the functions described herein. For example, the privacy server 102 may be embodied as, without limitation, a server, a rack-mounted server, a blade server, a workstation, a network appliance, a web appliance, a desktop computer, a laptop computer, a tablet computer, a smartphone, a consumer electronic device, a distributed computing system, a multiprocessor system, and/or any other computing device capable of performing the functions described herein. Additionally, in some embodiments, the privacy server 102 may be embodied as a "virtual server" formed from multiple computing devices distributed across the network 108 and operating in a public or private cloud. Accordingly, although the privacy server 102 is illustrated in FIG. 1 as embodied as a single computing device, it should be appreciated that the privacy server 102 may be embodied as multiple devices cooperating together to facilitate the functionality described below. As shown in FIG. 1, the illustrative privacy server 102 includes a processor 120, an I/O subsystem 122, memory 124, a data storage device 126, and a communication subsystem 128. Of course, the privacy server 102 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 124, or portions thereof, may be incorporated in the processor 120 in some embodiments.

The processor 120 may be embodied as any type of processor or compute engine capable of performing the functions described herein. For example, the processor may be embodied as a single or multi-core processor(s), digital signal processor, microcontroller, or other processor or processing/controlling circuit. Similarly, the memory 124 may be embodied as any type of volatile or non-volatile memory or data storage capable of performing the functions described herein. In operation, the memory 124 may store various data and software used during operation of the privacy server 102 such as operating systems, applications, programs, libraries, and drivers. The memory 124 is communicatively coupled to the processor 120 via the I/O subsystem 122, which may be embodied as circuitry and/or components to facilitate input/output operations with the processor 120, the memory 124, and other components of the privacy server 102. For example, the I/O subsystem 122 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 122 may form a portion of a system-on-a-chip (SoC) and be incorporated, along with the processor 120, the memory 124, and other components of the privacy server 102, on a single integrated circuit chip.

The data storage device 126 may be embodied as any type of device or devices configured for short-term or long-term storage of data such as, for example, memory devices and circuits, memory cards, hard disk drives, solid-state drives, or other data storage devices. The communication subsystem 128 of the privacy server 102 may be embodied as any communication circuit, device, or collection thereof, capable of enabling communications between the privacy server 102 and other remote devices. The communication subsystem 128 may be configured to use any one or more communication technology (e.g., wireless or wired communications) and associated protocols (e.g., Ethernet, InfiniBand® Bluetooth®, Wi-Fi®, WiMAX, 3G LTE, 5G, etc.) to effect such communication.

The client device 104 is configured to access the privacy server 102 and otherwise perform the functions described herein. The client device 104 may be embodied as any type of computation or computer device capable of performing the functions described herein, including, without limitation, a computer, a laptop computer, a notebook computer, a tablet computer, a mobile computing device, a wearable computing device, a multiprocessor system, a server, a rack-mounted server, a blade server, a network appliance, a web appliance, a distributed computing system, a processor-based system, and/or a consumer electronic device. Thus, the client device 104 includes components and devices commonly found in a computer or similar computing device, such as a processor, an I/O subsystem, a memory, a data storage device, and/or communication circuitry. Those individual components of the client device 104 may be similar to the corresponding components of the privacy server 102, the description of which is applicable to the corresponding components of the client device 104 and is not repeated herein so as not to obscure the present disclosure.

Each of the internet data sources 106 may be embodied as a web site, a social network, a database, a cloud storage server, an app backend, or any other data storage device and/or devices configured to store data that may be privacy relevant. Part or all of the data provided by the internet data sources 106 may be publicly available or may be private or otherwise access-controlled.

As discussed in more detail below, the privacy server 102, the client device 104, and/or the internet data sources 106 may be configured to transmit and receive data with each other and/or other devices of the system 100 over the network 108. The network 108 may be embodied as any number of various wired and/or wireless networks. For example, the network 108 may be embodied as, or otherwise include, a wired or wireless local area network (LAN), a wired or wireless wide area network (WAN), a cellular network, and/or a publicly-accessible, global network such as the Internet. As such, the network 108 may include any number of additional devices, such as additional computers, routers, stations, and switches, to facilitate communications among the devices of the system 100.

Figure 2:
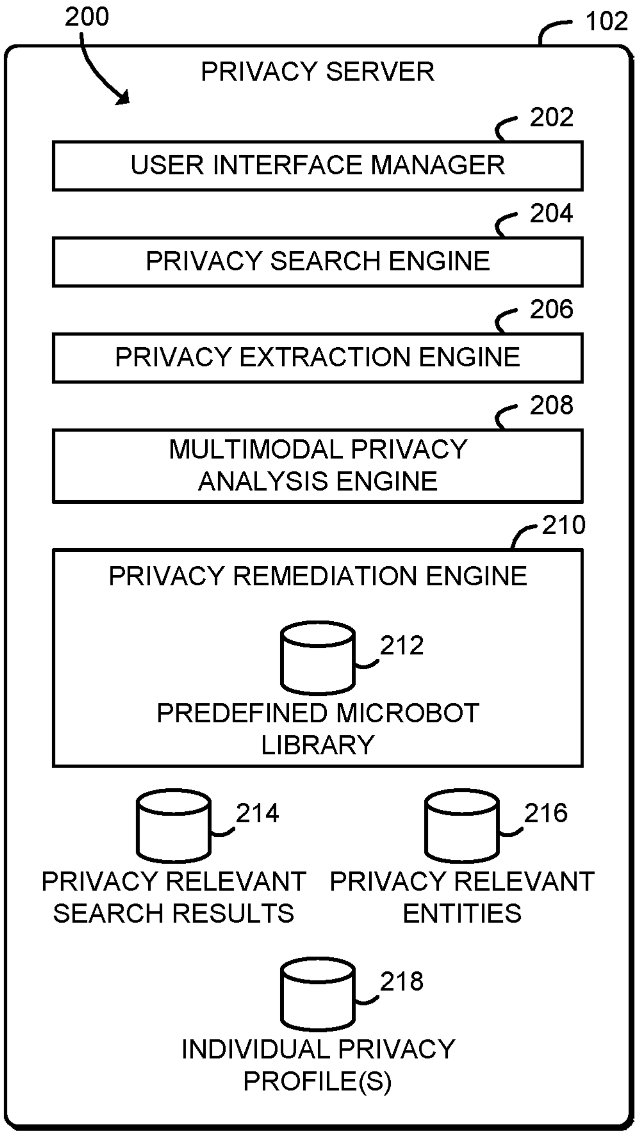
FIG. 2 is a simplified block diagram of at least one embodiment of an environment that may be established by a privacy server of the system of FIG. 1.

Referring now to FIG. 2, in the illustrative embodiment, the privacy server 102 establishes an environment 200 during operation. The illustrative environment 200 includes a user interface manager 202, a privacy search engine 204, a privacy extraction engine 206, a multimodal privacy analysis engine 208, and a privacy remediation engine 210. The various components of the environment 200 may be embodied as hardware, firmware, software, or a combination thereof. As such, in some embodiments, one or more of the components of the environment 200 may be embodied as circuitry or a collection of electrical devices (e.g., user interface manager circuitry 202, privacy search engine circuitry 204, privacy extraction engine circuitry 206, multimodal privacy analysis engine circuitry 208, and/or privacy remediation engine circuitry 210). It should be appreciated that, in such embodiments, one or more of those components may form a portion of the processor 120, the memory 124, the data storage 126, and/or other components of the privacy server 102.

The user interface manager 202 is configured to receive seed data for a privacy search from a user. The seed data includes general data relevant to an individual. This general data may include a name, a company, a city of residence, or an email address associated with the individual. The user interface manager 202 is further configured to present privacy search results to the user, including an individual privacy profile related to the individual as described further below.

The privacy search engine 204 is configured to search a plurality of internet sites based on the seed data to identify multiple privacy relevant search results 214. Each of the privacy relevant search results 214 is associated with an internet source 106 and an internet resource, such as a URL, URI, or other internet address. Searching the internet sites may include ranking the privacy relevant search results 214 according to privacy relevance.

The privacy extraction engine 206 is configured to extract multiple privacy relevant entities 216 from the privacy relevant search results 214. Each of the privacy relevant entities 216 is a multimodal asset, such as text, an image, video, sound, or other asset. Extracting the privacy relevant entities 216 may include detecting personally identifiable information from the privacy relevant search results 214. In some embodiments, extracting the privacy relevant entities 216 may include performing object detection for privacy sensitive content from the privacy relevant search results 214, which may include classifying objects with a fast region-based convolutional neural network (Fast R-CNN) algorithm. In some embodiments, performing object detection for privacy sensitive content may include detecting a high-value asset, detecting luxury travel, detecting drug or alcohol content, or detecting sex or nudity content. In some embodiments, extracting the privacy relevant entities 216 may include detecting a home address in an image or video, extracting a child's name or age, identifying a social media account associated with the individual, identifying a controversial conversation, identifying a current vacation post or a not home post, or extracting a banking challenge question or a banking challenge answer.

In some embodiments, extracting the privacy relevant entities 216 may include performing hybrid pixel-level deepfake analysis to identify falsified content. Performing the hybrid pixel-level deepfake analysis may include classifying an image or video of the privacy relevant search results 214 with a deep recursive neural network trained at pixel level to generate a first deepfake classification, classifying the image or video with a neural perceptron trained at a level higher than pixel level to generate a second deepfake classification, determining whether the first deepfake classification and the second deepfake classification commonly classify part or all of the image or video as a deepfake, and, if so, tagging the image or video as a possible deepfake.

The multimodal privacy analysis engine 208 is configured to refine the privacy relevant entities 216 to generate an individual privacy profile 218. The individual privacy profile 218 identifies privacy relevant entities 216 and associated privacy relevant search results 214, and is associated with the individual specified by the user. Refining the privacy relevant entities 216 may include analyzing the privacy relevant entities 216 with multiple trained artificial intelligence models, wherein the privacy relevant entities 216 include multiple entity modalities, and removing an irrelevant entity from the privacy relevant entities 216 in response that analysis. In some embodiments, refining the privacy relevant entities 216 to generate the individual privacy profile 218 may include disambiguating the privacy relevant entities 216.

The privacy remediation engine 210 is configured to identify the internet source 106 associated with a privacy relevant search result 214 in response to presenting the individual privacy profile 218 to the user. The privacy remediation engine 210 is further configured to select a microbot from multiple predefined microbots (such as a predefined microbot library 212) based on the internet source 102. The privacy remediation engine 210 is further configured to execute a remediation operation defined by the selected microbot. Executing the remediation operation may include sending a request for removal based on a predetermined template of the microbot or providing information to the internet source 106 based on a predetermined information definition of the microbot. In some embodiments, executing the remediation operation may include receiving that information from the user, such as receiving an authorization from the user. In some embodiments, executing the remediation operation may include processing a response received from the internet source 106 based on a predetermined processing definition of the microbot. In some embodiments, executing the remediation operation may include executing predetermined interaction logic of the microbot.

Figure 3:
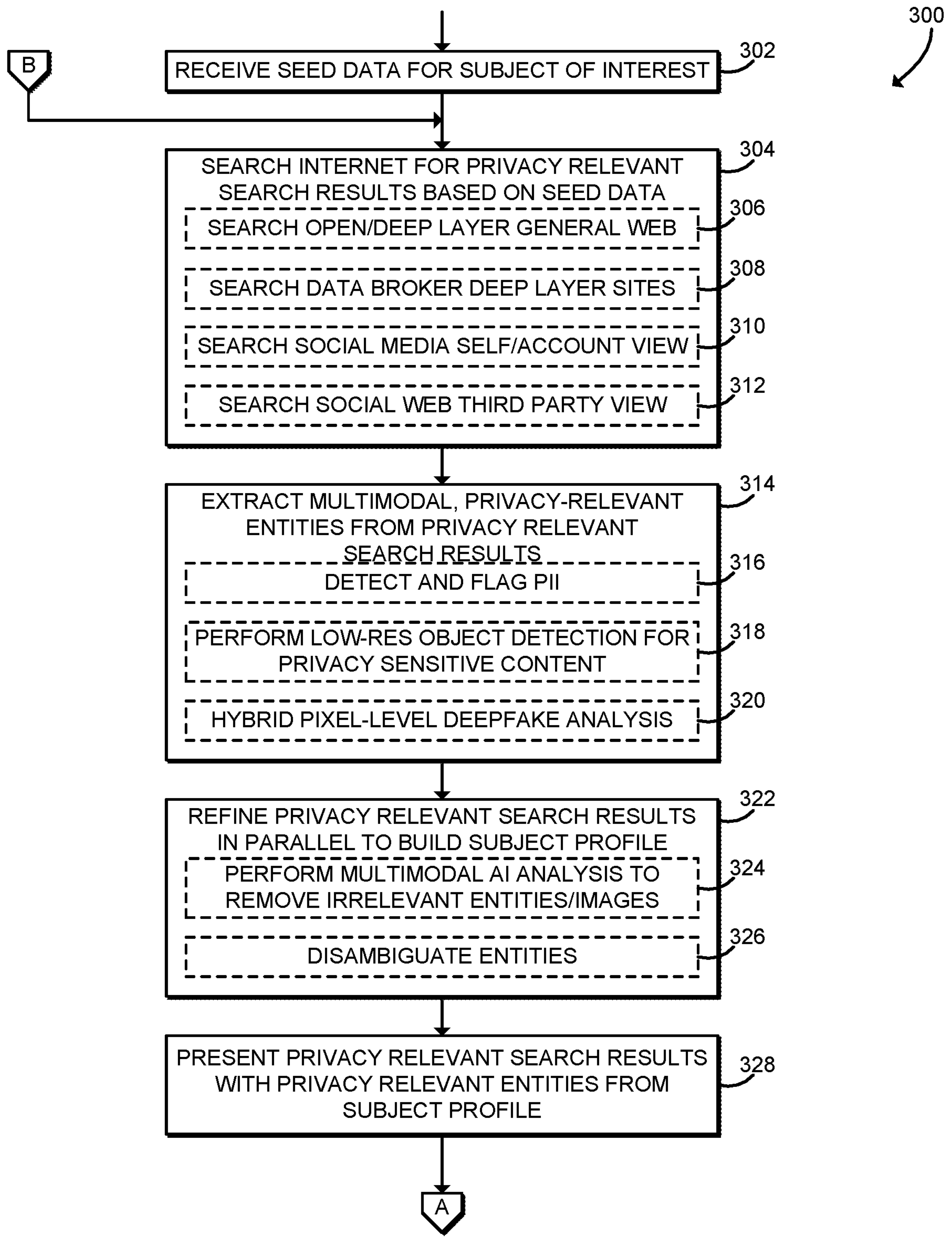
FIGS. 3 and 4 are a simplified flow diagram of at least one embodiment of a method for privacy search and remediation that may be executed by the privacy server of FIGS. 1 and 2.
Figure 4:
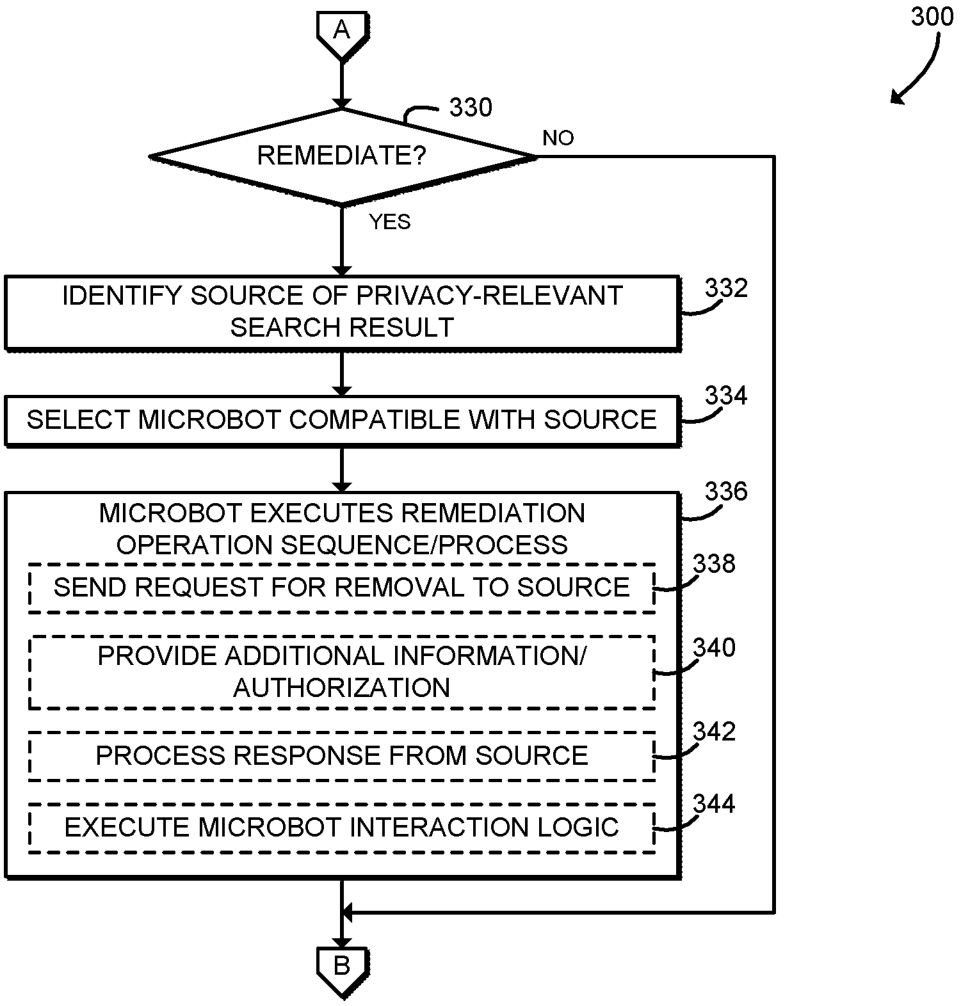

Referring now to FIGS. 3 and 4, in use, the privacy server 102 may execute a method 300 for privacy search and remediation. It should be appreciated that, in some embodiments, the operations of the method 300 may be performed by one or more components of the environment 200 of the privacy server 102 as shown in FIG. 2. The method 300 begins with block 302, in which the privacy server 102 receives seed data for a subject of interest. The subject of interest may be an individual, and the seed data is generally identifying data relevant to that individual, such as a name, a company, a city of residence, or an email address. The seed data may be received from the client device 104, for example through a web interface or other interface established by the privacy server 102. The user of the client device 104 may be the subject or another person or entity with an interest in privacy of the subject.

In block 304, the privacy server 102 searches multiple internet data sources 106 for privacy relevant search results 214 based on the seed data. The privacy server 102 may perform a lexical search, a natural language search, or other search of web content. The privacy server 102 may rank the search results 214 for relevance to privacy using a privacy relevant link ranking algorithm. For example, search results may be ranked based on authoritativeness, for example by examining hyperlinks or other references between different search results 214, or based on other privacy relevant parameters. To determine authoritativeness, the privacy server 102 may maintain an index or other information regarding web sites that are known to store privacy relevant information. Accordingly, by ranking privacy relevant search results 214, the privacy server 102 may reduce the search space for privacy relevant results by many orders of magnitude (e.g., from millions of potential web resources to thousands of likely highly relevant links). This reduction in search space may allow the privacy server 102 to present search results interactively, in real time, or otherwise with short response times. In some embodiments, in block 306 the privacy server 102 may search general web sites at a top layer or at a deep layer (e.g., by following one or more deep links). In some embodiments, in block 308 the privacy server 102 may search data broker web sites at a top layer or a deep layer. In particular, the privacy server 102 may maintain a list or other database of known data broker websites and search those websites at a deep layer. In some embodiments, in block 310 the privacy server 102 may search social media sites using an account or other credentials provided by the user of the client device 104. This search may provide privacy relevant results from the social media site that are visible to the account of the user. In some embodiments, in block 312 the privacy server 102 may search the social web with a third party view. For example, the privacy server 102 may search one or more social media sites without using an account or using an account that is unrelated or unknown to the user. This search may provide privacy relevant results from the social media site that are generally visible, including results that are not visible to the account of the user (e.g., from accounts that are blocked/private relative to the user).

In block 314, the analysis server 102 extracts multimodal, privacy relevant entities 216 from the privacy relevant search results 214. Each entity may be embodied as an image, a video, audio, text, or other web resources extracted from a web page or other internet source associated with the search result 214. The privacy relevant entities 216 may be extracted using one or more trained machine learning models, which may operate in parallel. Multiple privacy relevant entities 216 may be extracted from each search result 214. For example, for search results 214 from a data broker website, multiple images, text snippets, or other data may be extracted from each results page. One example of a method for extracting privacy relevant entities is described further below in connection with FIG. 5.

In some embodiments, in block 316 the privacy server 102 may detect and flag personally identifying information. In block 318, the privacy server 102 may perform low-resolution object detection in images and/or video for privacy sensitive content. In some embodiments, in block 320 the privacy server 102 may perform hybrid pixel-level deepfake analysis. One potential embodiment of a method for deepfake analysis is described below in connection with FIG. 6.

In block 322, the privacy server 102 refines the privacy relevant search results 214 in parallel in order to build a privacy profile 218 for the subject of interest. The privacy profile 218 includes search results 214 and/or privacy relevant entities 216 that are related to the subject of interest (e.g., an individual). Irrelevant search results 214 and/or irrelevant privacy relevant entities 216 are not included in the privacy profile 218. In some embodiments, in block 324 the privacy server 102 may perform multimodal artificial intelligence (AI) analysis to remove irrelevant entities 216 such as images. The privacy server 102 may input multi-mode privacy relevant entities 216 (e.g., text, images, and/or other modes of data) into one or more trained machine learning models in order to identify privacy relevant entities 216 that are related to the subject of interest and then remove irrelevant entities 216 from the profile 218. In some embodiments, the privacy server 102 may execute those multiple machine learning models in parallel.

In some embodiments, in block 326 the privacy server 102 may disambiguate one or more privacy relevant entities 214. Disambiguating the privacy relevant entities 214 may build an identity graph associated with the subject of interest. This disambiguation may be performed using multiple, parallel filter algorithms in connection with the multimodal AI analysis described above. For example, for a single search result 214 that includes multiple privacy relevant entities 216 (e.g., a web page with multiple images or other privacy relevant information) the privacy server 102 may identify those entities 216 that are related to the subject of interest. Continuing that example, a web article including unstructured content such as text and images may include content related to the subject of interest (e.g., a name and picture) as well as content related to other persons. The privacy server 102 may process the unstructured content and identify entities 216 related to the subject of interest (e.g., text data including the subject's name, image data including the subject's picture, etc.). Those relevant entities 216 may be included in the individual privacy profile 218. As another example, for multiple privacy relevant entities 216 that are similar or identical (e.g., matching names or other matching personally identifying information), the privacy server 102 may identify those entities 216 and/or search results 214 that are related to the subject of interest. Continuing that example, a deep layer data broker web page may include data for multiple individuals that share the same name. The privacy server 102 may identify those entities 216 that are related to the subject of interest and include those entities in the profile 218, and the privacy server 102 may remove entities 216 that are not related to the subject of interest from the profile 218 (i.e., remove entries related to other individuals with the same name).

In block 328, the privacy server 102 presents privacy relevant search results 214 with associated privacy relevant entities 216 from the privacy profile 218 to the user. The privacy server 102 may present the privacy profile 218 as a web page or other interactive user interface, which may be transmitted to the client device 104. The user interface may present the search results 214 and extracted privacy relevant entities 216 along with privacy relevant entity classification, priority or severity level, or other information generated by the privacy server 102. The user interface may allow the user to sort, filter, view details, and otherwise organize the privacy relevant search results 214.

In block 330, shown in FIG. 4, the privacy server 102 determines whether to perform privacy remediation. The privacy server 102 may perform privacy remediation, for example, in response to a user selection or other command received from the user. For example, the user may initiate automatic or semiautomatic privacy remediation for one or more privacy search results 214 presented by the privacy server 102 using the user interface as described above. If the privacy server 102 determines not to perform privacy remediation, the method 300 loops back to block 304, shown in FIG. 3, in which the privacy server 102 continues to perform privacy relevant searches. Referring again to block 330, if the privacy server 102 determines to perform privacy remediation, the method 300 advances to block 332.

In block 332, the privacy server 102 identifies the source 106 of a privacy relevant search result 214. The privacy relevant search result 214 may be selected by the user (e.g., using a web page listing or other user interface), or the privacy server 102 may select the search result 214 from individual profile 218 automatically based on privacy relevance or any other appropriate algorithm. The source 106 may include a web site, data broker, web address, IP address, or other identifier associated with the publisher, aggregator, or other source of the privacy relevant search result 214.

In block 334, the privacy server 102 selects a microbot compatible with the source 106 of the privacy relevant search result 214. The microbot includes predetermined interaction logic defining one or more steps to be performed by the privacy server 102 in order to remove the privacy relevant search result 214 from the source or otherwise remediate the privacy relevant search result 214. The microbot may be selected from the predefined microbot library 212 maintained by the privacy server 102. Each microbot is configured with interaction logic for a particular source and/or a particular cluster of related sources. In some embodiments, the microbot may inherit or otherwise re-use interaction logic from related microbots. To select the microbot, in some embodiments the privacy server 102 may sort the source into one of multiple predetermined clusters or buckets and select a predetermined microbot associated with that cluster. In an illustrative embodiment, the predefined microbot library 212 includes a few hundred individual clusters of microbots, which are suitable for performing remediation with 14,000-15,000 identified internet sources.

In block 336, the privacy server 102 executes a remediation operation sequence and/or process defined by the selected microbot. For example, the privacy server 102 may initiate execution of the selected microbot, which may autonomously execute the remediation operation or sequence. In some embodiments, in block 338 the privacy server 102 may send a request for removal to the source 106. The microbot may define the format and/or medium of the request. For example, in some embodiments, the request may be formatted as an HTML form or other web form and submitted as a web request. As another example, the request may be formatted and submitted as an email.

In some embodiments, in block 340 the privacy server 102 may provide additional information or authorization to the source 106. The privacy server 102 may receive that additional information and/or authorization from the user. For example, the user may supply information such as responses to challenge questions. As another example, the user may prove the presence of a human, for example by completing one or more CAPTCHAs or other human-presence tests. As yet another example, the user may authorize the privacy server 102 to access the internet source 106 by logging in to the source, providing a password for the source, or otherwise performing authorization (e.g., performing OAuth authorization for a social media site or otherwise authorizing the privacy server 102).

In some embodiments, in block 342 the privacy server 102 may process a response received from the source 106. The response may be a web response (e.g., an HTML page), an email, a text message, or other response received from the source. The privacy server 102 may parse the response, recognize elements in the response with one or more trained models, or otherwise extract data from the response according to one or more rules included in the microbot.

In some embodiments, in block 344 the privacy server 102 may execute additional microbot interaction logic. Interaction logic included in the microbot may include request and/or response message formatting, message parsing, interaction sequences, conditional evaluation, and/or other interaction logic. For example, the interaction logic may define a sequence of requests and corresponding responses, as well as conditional logic for selecting particular requests. Additionally or alternatively, in some embodiments, the microbot interaction logic may be embodied as one or more trained machine learning models. The microbot, using the trained models, may evaluate one or more responses received from the source (e.g., one or more web pages) and identify available actions for remediation (e.g., one or more links, inputs, or other available actions in the web page). Using its interaction logic, the microbot may autonomously evaluate the available actions and select an action for execution (e.g., based on output of the one or more trained models). Thus, the microbot may continue autonomously processing the remediation operation sequence. After executing the remediation operation sequence, the method 300 loops back to block 304, shown in FIG. 3, in which the privacy server 102 continues to perform privacy relevant searches.

Although the operations of the method 300 are illustrated in FIGS. 3 and 4 as being performed sequentially, it should be understood that in some embodiments, those embodiments may be performed iteratively, in parallel, or otherwise in a different ordering. For example, in some embodiments certain privacy relevant entities 216 may be extracted from the privacy relevant search results 214 after disambiguating or otherwise generating the individual privacy profile 218. As another example, in some embodiments, entity extraction and profile generation/disambiguation may be performed iteratively in multiple rounds.

Figure 5:
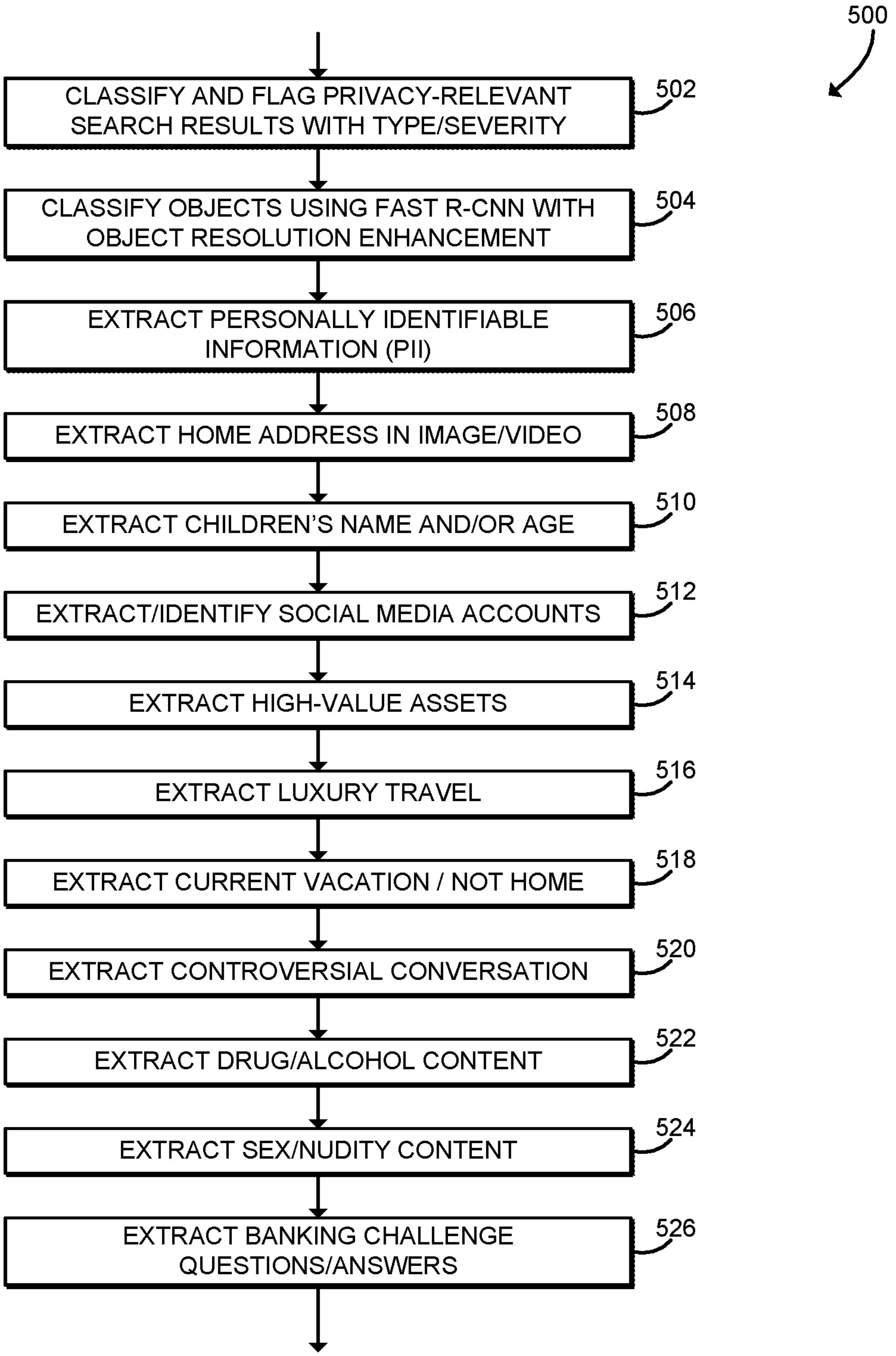
FIG. 5 is a simplified flow diagram of at least one embodiment of a method for object recognition for privacy sensitive content that may be executed by the privacy server of FIGS. 1 and 2.

Referring now to FIG. 5, in use, the privacy server 102 may execute a method 500 for object recognition and classification for privacy sensitive content. The method 500 may be executed, for example, in connection with block 314 of FIG. 3 or otherwise in connection with the method 300. The method 500 begins with block 502, in which the privacy server 102 classifies and flags privacy relevant search results 214 with a type and/or a severity. The privacy server 102 may execute on or more trained machine learning classifiers in order to classify the privacy relevant search results 214. In block 504, the privacy server 102 classifies objects using a fast region-based convolutional neural network algorithm (Fast R-CNN) with object resolution enhancement. The privacy server 102 may classify objects shown in images or in video.

In block 506, the privacy server 102 extracts personally identifiable information (PII) from the privacy relevant search results 214. The PII may include various categories of information such as birthdate, phone numbers, physical address, email address, or other privacy-relevant identifying information. In block 508, the privacy server 102 extracts a home address associated with the subject from images and/or video. For example, the privacy server 102 may identify a home address shown in one or more images associated with a real estate listing or other web site. In block 510, the privacy server 102 extracts a name and/or age associated with the subject's children. In some embodiments, the privacy server 102 may extract additional information related to the subject's children (minor or adult), such as images, school and school activities, or other information.

In block 512, the privacy server 102 extracts or otherwise identifies social media accounts associated with the subject. For example, the privacy server 102 may identify inactive or deactivated social media accounts associated with the user. In some embodiments, the privacy server 102 may identify "stub" or "ghost" social media accounts associated with the subject that may be generated by the social media platform and/or third parties. For example, certain social media platforms may allow tagging or otherwise identifying individuals in photos that do not have an active social media account with the platform.

In block 514, the privacy server 102 extracts high value assets. For example, the privacy server 102 may identify watches, jewelry, luxury products, or other high-value assets that appear in social media posts, images, or other search results 214. Similarly, in block 516, the privacy server 102 extracts luxury travel. For example, the privacy server 102 may recognize and classify vacation destinations, locations, modes of travel (e.g., private jet), or other indications of luxury travel. In block 518, the privacy server 102 extracts current vacation or "not home" posts or images. Such posts or images indicate that the subject is currently away from home and thus may represent increased risk of theft or burglary. The privacy server 102 may recognize and classify such "not home" posts differently from historical vacation posts that do not represent the same current risk.

In block 520, the privacy server 102 extracts controversial conversation content. Such conversation content may include any conversation content including the subject, about the subject, or otherwise related to the subject, and may include controversial topics or language such as bigotry, extreme politics, guns/weapons, abortion, religion, bullying, or other controversial content. In some embodiments, the privacy server 102 may extract negative sentiment news or other content associated with the subject. In block 522, the privacy server 102 extracts drug or alcohol content. In block 524, the privacy server 102 extracts sex or nudity content. Of course, in other embodiments, the privacy server 102 may extract additional categories of sensitive content such as profanity.

In block 526, the privacy server 102 extracts banking challenge question and/or answers. Such challenge questions and/or answers may include actual banking challenge interactions as well as general information related to common banking challenge questions. For example, in some embodiments the privacy server 102 may extract instances describing the city in which the subject was born, the subject's mother's maiden name, or other answers to questions commonly used to verify the identify of the subject. Additionally or alternatively, in some embodiments the privacy server 102 may extract other banking data, such as account numbers, routing numbers, account balances, and other banking information.

Figure 6:
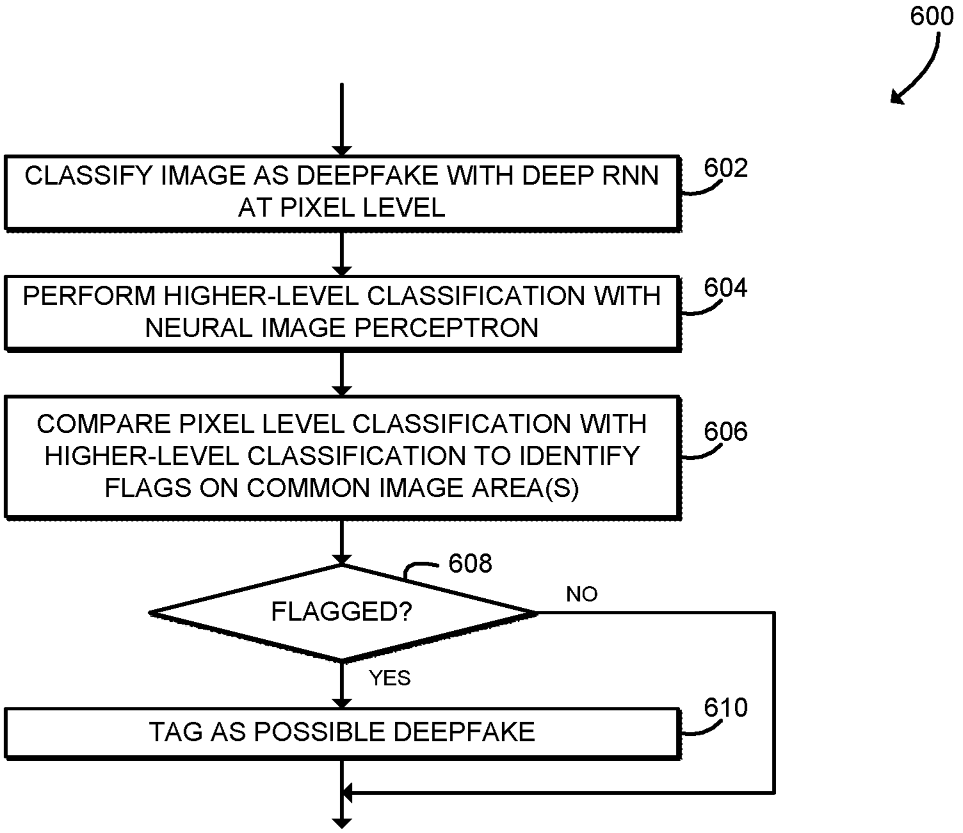
FIG. 6 is a simplified flow diagram of at least one embodiment of a method for classifying deepfake content that may be executed by the privacy server of FIGS. 1 and 2.

Referring now to FIG. 6, in use, the privacy server 102 may execute a method 600 for classifying deepfake content. The method 600 may be executed, for example, in connection with block 314 of FIG. 3 or otherwise in connection with the method 300. The method 600 begins with block 602, in which the privacy server 102 classifies an image (or video) as a deepfake (or not a deepfake) using a deep RNN trained at pixel level. Deepfakes include images, video, audio, or other media that have been tampered with by inserting content, removing content, or otherwise altering content such that the meaning of that media is altered.

Particularly for high-quality deepfakes, it may not be immediately obvious to a human observer that the media has been altered. In order to classify the media as deepfake, the RNN divides the image or video into small patches and examines those patches pixel-by-pixel. The RNN has been previously trained on thousands of images (deepfake and genuine) so that it recognizes qualities that make fakes stand out at the single-pixel level.

In block 604, the privacy server 102 performs higher-level classification on the image with a neural perceptron or other machine learning model. The model is trained on a higher-level encoding filter analysis, and thus classifies the image or video based on higher-level features above the pixel level (e.g., multiple pixels or regions of the image). This model also classifies the image or parts of the image as deepfake or not deepfake.

In block 606, the privacy server 102 compares the pixel-level classification from block 602 with the higher-level classification from block 604 to identify flagged deepfakes on any common areas of the image. The privacy server 102 may, for example, identify any pixels or regions of the image that have been classified as potentially deepfake by both the pixel-level and higher-level models.

In block 608, the privacy server 102 determines if any parts of the image are commonly flagged as deepfake. If not, the method 600 is completed. If any parts of the image are commonly flagged, the method 600 advances to block 610, in which the image is tagged as a possible deepfake. After tagging the image, the method 600 is completed. In some embodiments, the privacy server 102 may perform remediation of the tagged possible deepfake as described above in connection with FIG. 4.

What is claimed is:

1. A computing device for privacy management, the computing device comprising:
- a processor; and
- one or more memory devices having stored therein a plurality of instructions that, when executed by the processor, cause the processor to establish:
- a user interface manager to receive seed data for a privacy search, the seed data comprising general data relevant to an individual, wherein the general data comprises a name, a company, a city of residence, or an email address;
- a privacy search engine to search a plurality of internet sites based on the seed data to identify a plurality of privacy relevant search results, wherein each privacy relevant search result is associated with an internet source and an internet resource;
- a privacy extraction engine to extract a plurality of privacy relevant entities from the plurality of privacy relevant search results, wherein each entity of the privacy relevant entities comprises a multimodal asset and wherein to extract the plurality of privacy relevant entities comprises to perform object detection for privacy sensitive content from the plurality of privacy relevant search results by classifying objects with a fast region-based convolutional neural network (Fast R-CNN) algorithm; and
- a multimodal privacy analysis engine to refine the plurality of privacy relevant entities to generate an individual privacy profile, wherein the individual privacy profile identifies privacy relevant entities and associated privacy relevant search results, and wherein the individual privacy profile is associated with the individual,
- wherein the user interface manager is further to present the individual privacy profile to a user.

2. The computing device of claim 1, wherein to search the plurality of internet sites comprises to rank the plurality of privacy relevant search results according to privacy relevance.

3. The computing device of claim 1, wherein to extract the plurality of privacy relevant entities comprises to detect personally identifiable information from the plurality of privacy relevant search results.

4. The computing device of claim 1, wherein to perform object detection comprises to:
- detect a high-value asset in a privacy relevant search result;
- detect luxury travel in a privacy relevant search result;
- detect drug or alcohol content in a privacy relevant search result; or
- detect sex or nudity content in a privacy relevant search result.

5. The computing device of claim 1, wherein to extract the plurality of privacy relevant entities comprises to extract a child's name or age in a privacy relevant search result.

6. The computing device of claim 1, wherein to extract the plurality of privacy relevant entities comprises to identify a social media account associated with the individual in a privacy relevant search result.

7. The computing device of claim 1, wherein to extract the plurality of privacy relevant entities comprises to identify a controversial conversation in a privacy relevant search result.

8. The computing device of claim 1, wherein to extract the plurality of privacy relevant entities comprises to extract a banking challenge question or a banking challenge answer in a privacy relevant search result.

9. The computing device of claim 1, wherein to extract the plurality of privacy relevant entities comprises to perform hybrid pixel-level deepfake analysis to identify falsified content, wherein to perform the hybrid pixel-level deepfake analysis comprises to:
- classify an image or video of the privacy relevant search results with a deep recursive neural network trained at pixel level to generate a first deepfake classification;
- classify the image or video of the privacy relevant search results with a neural perceptron trained at a level higher than pixel level to generate a second deepfake classification;
- determine whether the first deepfake classification and the second deepfake classification commonly classify part or all of the image or video as a deepfake; and
- tag the image or video as a possible deepfake in response to a determination that the first deepfake classification and the second deepfake classification commonly classify part or all of the image or video as a deepfake.

10. The computing device of claim 1, wherein to refine the plurality of privacy relevant entities to generate the individual privacy profile comprises to disambiguate the plurality of privacy relevant entities.

11. The computing device of claim 1, further comprising a privacy remediation engine to:
- identify the internet source associated with a privacy relevant search result of the plurality of privacy relevant search results in response to presentation of the individual privacy profile to the user;
- select a microbot from a plurality of predefined microbots based on the internet source; and
- execute a remediation operation defined by the microbot.

12. The computing device of claim 11, wherein to execute the remediation operation comprises to execute predetermined interaction logic of the microbot.

13. The computing device of claim 11, wherein to execute the remediation operation comprises to process a response received from the internet source with a trained model of the microbot.

14. A computing device for privacy management, the computing device comprising:

a processor; and a memory having stored therein a plurality of instructions that, when executed, cause the processor to establish:

a user interface manager to receive seed data for a privacy search, the seed data comprising general data relevant to an individual, wherein the general data comprises a name, a company, a city of residence, or an email address;

a privacy search engine to search a plurality of internet sites based on the seed data to identify a plurality of privacy relevant search results, wherein each privacy relevant search result is associated with an internet source and an internet resource;

a privacy extraction engine to extract a plurality of privacy relevant entities from the plurality of privacy relevant search results, wherein each entity of the privacy relevant entities comprises a multimodal asset; and a multimodal privacy analysis engine to refine the plurality of privacy relevant entities to generate an individual privacy profile, wherein the individual privacy profile identifies privacy relevant entities and associated privacy relevant search results, and wherein the individual privacy profile is associated with the individual, wherein to refine the plurality of privacy relevant entities to generate the individual privacy profile comprises to:

(i) analyze the plurality of privacy relevant entities with a plurality of trained artificial intelligence models, wherein the plurality of privacy relevant entities comprise a plurality of entity modalities; and (ii) remove an irrelevant entity from the plurality of privacy relevant entities in response to analysis of the plurality of privacy relevant entities, wherein the user interface manager is further to present the individual privacy profile to a user.

15. A method for privacy management, the method comprising:

receiving, by a computing device, seed data for a privacy search, the seed data comprising general data relevant to an individual, wherein the general data comprises a name, a company, a city of residence, or an email address;

searching, by the computing device, a plurality of internet sites based on the seed data to identify a plurality of privacy relevant search results, wherein each privacy relevant search result is associated with an internet source and an internet resource;

extracting, by the computing device, a plurality of privacy relevant entities from the plurality of privacy relevant search results, wherein each entity of the privacy relevant entities comprises a multimodal asset;

refining, by the computing device, the plurality of privacy relevant entities to generate an individual privacy profile, wherein the individual privacy profile identifies privacy relevant entities and associated privacy relevant search results, and wherein the individual privacy profile is associated with the individual, wherein refining the plurality of privacy relevant entities to generate the individual privacy profile comprises:

(i) analyzing the plurality of privacy relevant entities with a plurality of trained artificial intelligence models, wherein the plurality of privacy relevant entities comprise a plurality of entity modalities; and (ii) removing an irrelevant entity from the plurality of privacy relevant entities in response to analyzing the plurality of privacy relevant entities; and presenting, by the computing device, the individual privacy profile to a user.

16. The method of claim 15, wherein extracting the plurality of privacy relevant entities comprises performing object detection for privacy sensitive content from the plurality of privacy relevant search results.

17. The method of claim 15, further comprising:

identifying, by the computing device, the internet source associated with a privacy relevant search result of the plurality of privacy relevant search results in response to presenting the individual privacy profile to the user;

selecting, by the computing device, a microbot from a plurality of predefined microbots based on the internet source; and executing, by the computing device, a remediation operation defined by the microbot.

* * * * *